United States Patent
Huh et al.

(10) Patent No.: US 7,161,972 B2
(45) Date of Patent: Jan. 9, 2007

(54) METHOD AND APPARATUS FOR DOWNLINK JOINT DETECTION IN A COMMUNICATION SYSTEM

(75) Inventors: Hoon Huh, Songnam-shi (KR); Hee-Won Kang, Songnam-shi (KR); Wei-Chung Peng, Los Angeles, CA (US); Dennis Lai, Los Angeles, CA (US); Jeng-Hong Chen, Los Angeles, CA (US)

(73) Assignees: Samsung Electronics Co., Ltd. (KR); The Titan Corporation CA (US)

( * ) Notice: Subject to any disclaimer, the term of this patent is extended or adjusted under 35 U.S.C. 154(b) by 654 days.

(21) Appl. No.: 10/161,154

(22) Filed: Jun. 3, 2002

(65) Prior Publication Data

US 2003/0095585 A1    May 22, 2003

(30) Foreign Application Priority Data

Jun. 1, 2001   (KR)   ...................... 10-2001-0030676

(51) Int. Cl.
 *H04B 1/707* (2006.01)
(52) U.S. Cl. .................................................... 375/147
(58) Field of Classification Search ................ 375/144, 375/147, 148, 262, 265, 340, 341, 346, 348, 375/350; 370/335, 342
See application file for complete search history.

(56) References Cited

U.S. PATENT DOCUMENTS

| | | | |
|---|---|---|---|
| 5,706,402 A * | 1/1998 | Bell | 706/22 |
| 6,175,588 B1 * | 1/2001 | Visotsky et al. | 375/148 |
| 6,339,612 B1 * | 1/2002 | Stewart et al. | 375/140 |
| 6,775,260 B1 * | 8/2004 | Dabak et al. | 370/342 |

\* cited by examiner

*Primary Examiner*—Young T. Tse
(74) *Attorney, Agent, or Firm*—The Farrell Law Firm

(57) ABSTRACT

A ZF joint detection apparatus for a downlink receiver, the apparatus comprising: a channel estimator for estimating a channel impulse response of a multipath fading channel of a received signal; a channel equalizer for estimating a transmission signal by performing channel compensation and removing multipath interference by a deconvolution technique based on the estimated channel impulse response; and a user detector for detecting a symbol-level data sequence transmitted by a specific user by despreading the transmission signal estimated by the channel equalizer with a spreading code for the specific user and a scrambling code.

8 Claims, 3 Drawing Sheets

METHOD AND APPARATUS FOR DOWNLINK JOINT DETECTION IN A COMMUNICATION SYSTEM

PRIORITY

This application claims priority to an application entitled "Method and Apparatus for Downlink Joint Detection in a Communication System" filed in the Korean Industrial Property Office on Jun. 1, 2001 and assigned Ser. No. 2001-30676, the contents of which are hereby incorporated by reference.

BACKGROUND OF THE INVENTION

1. Field of the Invention

The present invention relates generally to a communication system, and in particular, to a joint detection apparatus and method used for a downlink receiver in a CDMA (Code Division Multiple Access) communication system.

2. Description of the Related Art

A CDMA communication system simultaneously receives/transmits a plurality of user signals in the same frequency band and time period, after separating the user signals with associated spreading codes previously assigned to the respective users. A radio channel undergoes an attenuation of waves and a change in fading according to circumstances. A transmission signal from a transmitter arrives at a receiver through multiple paths. The receiver for the CDMA communication system receives inter-symbol interference (ISI) and multiple access interference (MAI) along with the transmission signal due to the radio channel environments. Here, the ISI refers to an interference caused by multipath components of the same user signal, while the MAI refers to an interference caused by a single-path component and multi-path components of different user signals. The existing receiver for the CDMA communication system restores (demodulates) only the transmission signal to its user, using a matched filter, while regarding such interferences as noises.

In the communication system, a base station exchanges signals with a plurality of mobile stations, and reception power at the base station and the mobile station depends upon a distance and a channel condition between the base station and the mobile station. That is, a decrease in the distance between the base station and the mobile station leads to an increase in power of a received signal, whereas an increase in the distance between the base station and the mobile station brings about a decrease in power of the received signal. Therefore, a signal from a user at a long distance undergoes interference with a signal from a user at a short distance, so the system using the matched filter cannot correctly restore user signals. Such a phenomenon is called a "near-far problem", and the system using the matched filter employs power control in order to solve this problem. That is, the system decreases transmission power of a signal to the user at a short distance, and increases transmission power of a signal to the user at a long distance. Here, for correct power control, the system requires accurate reception power measurement and a feedback signal channel.

Unlike the matched filter-based receiver that regards the interferences as noises, a device designed to remove an influence of the interferences between the users by processing user interference signals as separate signals is referred to as a "joint detector (JD)" or "multi-user detector". An optimal joint detector, such as an ML (Maximum Likelihood) joint detector using an ML algorithm, has high complexity, so it is not possible to realize the ML joint detector at the current state of the art. Accordingly, various quasi-optimal joint detectors have been proposed. The quasi-optimal joint detectors have lower complexity than the optimal joint detector, and show better performance than the existing matched filter-based receiver.

Typically, the proposed quasi-optimal joint detector includes a ZF (Zero Forcing) joint detector using a ZF algorithm, and an MMSE (Minimum Mean Square Error) joint detector using an MMSE algorithm. The ZF joint detector and the MMSE joint detector should completely remove both the inter-symbol interference and the multiple access interference by removing a cross-correlation between multipath signals and a cross-correlation between different user signals. There is a strong possibility that the ZF joint detector and the MMSE joint detector can be realized. Further, these joint detectors have been proposed as a candidate for a receiver for an IMT-2000 system, an advanced mobile communication system. Meanwhile, unlike the joint detector, a device aimed to remove the inter-symbol interference is referred to as an equalizer. An equalizer using the ZF algorithm is called a "ZF equalizer", while an equalizer using the MMSE algorithm is called an "MMSE equalizer".

A description will now be made of a joint detector in a communication system according to the prior art. Herein, the description will be given based on the 3GPP ($3^{rd}$ Generation Partnership Project) TDD (Time Division Duplex) specification, one of the IMT-2000 specifications. In the 3GPP/TDD scheme, spreading codes and scrambling codes have a short length. As a result, a great deal of research is being carried out on the application of the joint detector. The joint detector will be described with reference to the ZF joint detector, a typical linear joint detector.

FIG. 1 illustrates structures of an uplink transmitter, a channel and a receiver with a joint detector in a 3GPP/TDD CDMA communication system according to the prior art. Herein, an encoder and an interleaver in the transceiver structure will not be described, and only a joint detector-related part in a baseband device will be described. Although a downlink and an uplink can be both considered, the description will be made with reference to the uplink supporting K users, since the downlink can be regarded as a specific case of the uplink. In the uplink, the transmitter serves as the mobile station and the receiver serves as the base station. On the contrary, in the downlink, the transmitter serves as the base station and the receiver serves as the mobile station.

Referring to FIG. 1, a first user's data sequence is modulated into a QPSK (Quadature Phase Shift Keying) signal by a QPSK modulator 101, and then spread with a spreading code assigned to the first user by a CDMA spreader 102. The signal spread by the CDMA spreader 102 is scrambled with a scrambling code by a scrambler 103. The scrambled signal is filtered by an RRC (Root Raised Cosine) filter 104 before being transmitted. The signal transmitted by the RRC filter 104 is added to other user signals and AWGN (Additive White Gaussian Noise) 116, while passing a multipath fading channel 105. Meanwhile, a $K^{th}$ user's data sequence is modulated into a QPSK signal by a QPSK modulator 111, and then spread with a spreading code assigned to the $K^{th}$ user by a CDMA spreader 112. The spread signal is scrambled with a scrambling code by a scrambler 113. The scrambled signal is filtered by an RRC filter 114 before being transmitted. The transmitted signal is added to other user signals and AWGN 116 through a multipath fading channel 115.

Therefore, the receiver receives a signal obtained by adding the user signals received through the multiple paths to the AWGN, and the received signal is provided to a channel estimator 118 and a joint detector 132 through an RRC filter 117. The channel estimator 118 performs channel estimation on a channel impulse response of the multipath fading channel, and provides the channel-estimated results to the joint detector 132. A multiplier 121 multiplies a first user's spreading code Code#1 by a scrambling code, and provides its output to the joint detector 132. The receiver performs the above process even on the other users. Therefore, a multiplier 131 multiplies a $K^{th}$ user's spreading code Code#K by the scrambling code, and provides its output to the joint detector 132. The joint detector 132 performs detection on the user data sequences using the results obtained by multiplying the user spreading sequences by the scrambling code. An operation of the joint detector 132 will be described in detail herein below.

An operating principle of the uplink joint detector in the CDMA communication system will be described herein below in accordance with the following equations. For example, in the CDMA communication system supporting (servicing) K users, a $k^{th}$ user's data sequence with a length N is defined as $$d^{(k)} = \left(d_1^{(k)}, d_2^{(k)}, \ldots, d_N^{(k)}\right)^T \text{ for } k = 1, 2, \ldots, K \quad (1)$$

Here, a $k^{th}$ user's spreading sequence with a spreading gain Q is defined as $$c^{(k)} = \left(c_1^{(k)}, c_2^{(k)}, \ldots, c_Q^{(k)}\right)^T \text{ for } k = 1, 2, \ldots, K \quad (2)$$

Here, a channel impulse response with a length W for the $k^{th}$ user is defined as $$h^{(k)} = \left(h_1^{(k)}, h_2^{(k)}, \ldots, h_W^{(k)}\right)^T \text{ for } k = 1, 2, \ldots, K \quad (3)$$

A combined channel impulse response obtained by combining the spreading sequence with the channel impulse response is defined as $$b^{(k)} = \left(b_1^{(k)}, b_2^{(k)}, \ldots, b_{Q+W-1}^{(k)}\right)^T = c^{(k)} * h^{(k)} \text{ for } k = 1, 2, \ldots, K \quad (4)$$

If the data sequence of Equation (1) passes through the combined channel impulse response of Equation (4), a length of the sequence becomes NQ+W−1, and a noise sequence also has the same length and is expressed as $$n = (n_1, n_2, \ldots, n_{Q+W-1})^T \quad (5)$$

An average of respective elements of the noise sequence is '0', and a covariance matrix based on white Gaussian distribution with a variance $\sigma^2$ is expressed as $R_n = E[n \cdot n^H]$, where E[X] means the expectation of variable X and $n^H$ represents a Hermitian, that is, the conjugation of a transposition for the matrix n.

From Equation (1), a data sequence of K users for the connected users' data sequences is calculated by $$d^{(k)} = (d^{(1)T}, d^{(2)T}, \ldots, d^{(K)T})^T = (d_1, d_2, \ldots, d_{KN})^T \quad (6)$$

From Equation (4), respective combined channel impulse responses for K users' data sequences with a length N can be expressed in a matrix as follows.

$$A = (A_{ij}); i = 1, 2, \ldots, NQ + W - 1, j = 1, 2, \ldots, KN \quad (7)$$

$$A_{Q(n-1)+l,n+N(k-1)} = \begin{cases} b_l^{(k)} & \text{for } k = 1, \ldots, K, n = 1, \ldots, N \\ 0 & \text{else} \end{cases}$$

From Equations (1) to (7), a sequence received at the receiver is expressed as $$r = (r_1, r_2, \ldots, r_{Q+W-1})^T = Ad + n \quad (8)$$

For the received sequence, the ZF joint detector estimates a sequence minimizing a value represented by Equation (9) as a data sequence.

$$(r - A\hat{d}_{ZF})^H R_n^{-1}(r - A\hat{d}_{ZF}) \quad (9)$$

A data sequence satisfying Equation (9) is calculated by $$\hat{d}_{ZF} = (A^H R_n^{-1} A)^{-1} A^H R_n^{-1} r = d + (A^H R_n^{-1} A)^{-1} A^H R_n^{-1} n \quad (10)$$

(User Data Sequence)+(Noise)

If a correlation coefficient in each term of the noise sequence in Equation (5) is '0', a covariance matrix of the noise is expressed as $R_n = \sigma^2 I$, and Equation (10) is rewritten as $$\hat{d}_{ZF} = (A^H A)^{-1} A^H r \quad (11)$$

Matrix calculation of Equation (11) is expressed as follows by Cholesky Decomposition for inverse matrix calculation.

$$A^H A = LDL^H \quad (12)$$

In Equation (12), D represents a diagonal matrix and L represents a lower triangular matrix.

Since the ZF joint detector performs matrix calculation on the combined channel impulse response matrix, its output becomes a value estimated for the respective symbols of a data sequence. The ZF joint detector outputting the above symbol estimated value will be called a "symbol-level detector", in order to distinguish it from a chip-level ZF joint detector, which will be described below in relation to the downlink.

The symbol-level ZF joint detector is simpler in complexity than the optimal joint detector, but it still has a high complexity and requires accurate channel estimation and many calculations. Most of the calculations are concentrated on multiplication of an A matrix related to the combined channel impulse response and inverse matrix calculation. The A matrix has a row with a length of NQ+W−1 and a column with a length of KN, wherein the row length is in proportion to a length of the data sequence and a spreading gain, and the column length is proportion to the number of users and a length of the data sequence. Therefore, an increase in the length of the data sequence or an increase in the number of users causes a considerable increase in calculations of the A matrix and the inverse matrix so that the joint detector cannot be realized.

When the ZF joint detector is applied to the downlink of the CDMA communication system, its complexity may be partially decreased in light of the downlink characteristic. In the downlink, the base station serves as the transmitter and the mobile station serves as the receiver, so the mobile stations of the respective users are not required to estimate other users' data sequences in addition to its own data sequence, and channel impulse responses of all of the users have the same value. Like the uplink, the downlink can also use the ZF joint detector algorithm. Herein, however, the description will be made of a downlink ZF joint detector algorithm, the complexity of which is reduced using the downlink characteristic. In this algorithm, the ZF joint detector is comprised of a ZF block channel equalizer and a single-user detector.

FIG. 2 illustrates structures of a downlink transmitter, a channel and a receiver with a joint detector in a 3GPP/TDD CDMA communication system according to the prior art. Referring to FIG. 2, a first user's data sequence is modulated into a QPSK signal by a QPSK modulator 201, and then spread with a spreading code assigned to the first user by a CDMA spreader 202. Likewise, a $K^{th}$ user's data sequence is modulated into a QPSK signal by a QPSK modulator 211, and then spread with a spreading code assigned to the $K^{th}$ user by a CDMA spreader 212. The spread signals of the respective users are summed (or XORed) on a chip level by a summer 213, and then scrambled with a unique scrambling code of the base station by a scrambler 214. The scrambled signal is filtered by an RRC filter 215 before being transmitted. The transmitted signal, to which AWGN 217 is added while it passes a multipath fading channel 216, is received at the receiver.

The receiver provides the received signal to a channel estimator 219 and a channel equalizer 220 through an RRC filter 218. The channel estimator 219 performs channel estimation on a channel impulse response of the multipath fading channel, and provides the channel-estimated results to the channel equalizer 220. The channel equalizer 220 compensates for multipath channel fading of the received signal using the estimated channel impulse response, thereby to remove multipath interference from the received signal. The signal output from the channel equalizer 220 is provided to a single-user detector 222. The single-user detector 222 despreads the signal output from the channel equalizer 220 with an $i^{th}$ user's spreading code and a scrambling code output from a multiplier 221, thereby to detect an $i^{th}$ user's data sequence.

An operating principle of the downlink ZF joint detector will be described herein below in accordance with the following equations. From Equation (2), a spreading sequence for the respective user data sequences is expressed in a matrix as follows.

$$C = (C_{ij}); i = 1, 2, \ldots, NQ, j = 1, 2, \ldots, KN \quad (13)$$

$$C_{Q(n-1)+q,N(k-1)+n} = \begin{cases} c_q^{(k)} & \text{for } q=1,\ldots,Q, n=1,\ldots,N, k=1,\ldots,K \\ 0 & \text{else} \end{cases}$$

Further, from Equation (3), a channel impulse response for the respective user spreading sequences is expressed in a matrix as follows.

$$H^{(k)} = (H_{ij}^{(k)}); i = 1, 2, \ldots, NQ + W - 1, j = 1, 2, \ldots, NQ \quad (14)$$

-continued
$$H_y = \begin{cases} h_{i-j+1}^{(k)} & \text{if } 1 \le i - j + 1 \le W \\ 0 & \text{else} \end{cases}$$

Further, a reception noise of a specific user, i.e., a $k^{th}$ user, for Equation (5) is represented by $$n^{(k)} = \left(n_1^{(k)}, n_2^{(k)}, \ldots, n_{Q+W-1}^{(k)}\right)^T \quad (15)$$

From Equations (6), (13), (14) and (15), a received sequence of the $k^{th}$ user is expressed as $$r^{(k)} = \left(r_1^{(k)}, r_2^{(k)}, \ldots, r_{Q+W-1}^{(k)}\right)^T = H^{(k)}Cd + n^{(k)} \quad (16)$$

For the received sequence, the downlink ZF joint detector, i.e., a chip-level ZF joint detector, unlike the symbol-level ZF joint detector described above in relation to the uplink, acquires a received chip-level spreading sequence by passing the received sequence through the ZF block channel equalizer using the channel impulse response matrix. Further, the chip-level ZF joint detector searches an estimation value for the respective symbols of the data sequence by passing again the received chip-level spreading sequence through the single-user detector 222. In this manner, unlike the symbol-level ZF joint detector, the chip-level ZF joint detector performs chip-level detection. The chip-level ZF joint detector, the complexity of which is reduced using the characteristic of the downlink, can be used in the downlink. A chip-level output $s_{ZF}^{(k)}$ from the channel equalizer 220 for the received sequence is represented by $$s_{ZF}^{(k)} = \left(H^{(k)H} H^{(k)}\right)^{-1} H^{(k)H} e^{(k)} \quad (17)$$
$$e(k) \to r^{\wedge}(k)$$

By passing the output of the ZF block channel equalizer 220 through the single-user detector 222, it is possible to estimate a desired user data sequence given below.

$$\hat{d}_{ZF}^{(k)} = \left(diag(C^{(k)H} C^{(k)})\right)^{-1} C^{(k)H} s_{ZF}^{(k)} \quad (18)$$
$$= \left(diag(C^{(k)H} C^{(k)})\right)^{-1} C^{(k)H} \cdot \left(H^{(k)H} H^{(k)}\right)^{-1} e^{(k)} e(k) \to r^{\wedge}(k)$$

For a comparison between the chip-level ZF joint detector and the symbol-level ZF joint detector, Equations (8) and (16) can be generalized as follows.

$$r = HCd + n \quad (19)$$

In Equation (19), r indicates a received sequence, H indicates a channel impulse response sequence, C indicates a spreading sequence, and n indicates a noise sequence.

If A=HC, Equation (19) is expressed as Ad+n=r. In this case, the symbol-level ZF joint detector personally estimates a symbol-level data sequence by calculating Ad+n=r for d. However, if s=Cd, Equation (19) is expressed as Hs+n=r. In this case, the chip-level ZF joint detector estimates a chip-level data sequence by calculating Hs+n=r for s, and then estimates a symbol-level data sequence by applying the single-user detector 222 to the estimated chip-level data sequence.

A calculation order and major calculations of the symbol-level ZF joint detector will be described herein below on a step-by-step basis. Here, calculations of the symbol-level ZF joint detector will be expressed in terms of the number of multiplications that cause an increase in complexity in actual implementation.

Step 1: Matrix Multiplication for Calculating $A^H A$ and $A^H r$ in Equation (11)

Calculations for $A^H A$ and $A^H r$ are $(Q+W-1)*(NK)^2$ times of multiplication and $(Q+W-1)*KN$ times of multiplication, respectively.

Step 2: Cholesky Decomposition for Calculating $A^H A = LDL^H$

Calculations are in proportion to $N^3$ times of multiplication.

Step 3: Forward and Reverse Replacement and Elimination for Estimating d in $LDL^H d = A^H r$ Next, a calculation order and major calculations of the chip-level ZF joint detector will be described herein below on a step-by-step basis.

Step 1: Matrix Multiplication for Calculating $H^H H$ and $H^H r$ in Equation (17)

Calculations for $H^H H$ and $H^H r$ are $W*(NQ)^2$ times of multiplication and $W*KQ$ times of multiplication, respectively.

Step 2: Cholesky Decomposition for Calculating $H^H H = LDL^H$

Calculations are in proportion to $(NQ)^3$ times of multiplication, but the calculations are in proportion to $W^2*NQ$ times of multiplication in a band diagonal matrix $H^H H$.

Step 3: Forward and Reverse Replacement and Elimination for Estimating s in $LDL^H s = A^H r$ Step 4: Spreading Code Multiplication for Despreading s Calculated in Step 3

Both the symbol-level and chip-level ZF joint detectors require the maximum amount of calculations in the Cholesky Decomposition process of Step 2. In Step 2, the symbol-level and chip-level ZF joint detectors require calculations in proportion to $N^3$ and $W^2*NQ$, respectively, and a length N of the data sequence is much greater than a spreading gain Q and a channel impulse response length W. Therefore, the chip-level ZF joint detector has less complexity and calculations in realization as compared with the symbol-level ZF joint detector. However, the chip-level ZF joint detector requires calculations of the same order for N, Q and W, so it still requires considerably high complexity. Accordingly, it is not possible to reduce the calculations and complexity to a desirable level, causing a problem in realization.

SUMMARY OF THE INVENTION

It is, therefore, an object of the present invention to provide an apparatus and method for reducing implementation complexity of a ZF joint detector used for a downlink receiver in a CDMA communication system.

It is another object of the present invention to provide an apparatus and method for calculating a low initial complexity value of a ZF joint detector used for a downlink receiver in a CDMA communication system.

To achieve the above and other objects, the present invention provides a ZF joint detection apparatus used for a downlink receiver. The apparatus comprises a channel estimator for estimating a channel impulse response of a multipath fading channel of a received signal; a channel equalizer for estimating a transmission signal by performing channel compensation and removing multipath interference by a deconvolution technique based on the estimated channel impulse response; and a user detector for detecting a symbol-level data sequence transmitted by a specific user by despreading the transmission signal estimated by the channel equalizer with a spreading code for the specific user and a scrambling code.

To achieve the above and other objects, the present invention provides a ZF joint detection method used for a downlink receiver. The method comprises estimating a channel impulse response of a multipath fading channel of a received signal; and estimating a transmission signal by performing channel compensation and removing multipath interference by a deconvolution technique based on the estimated channel impulse response.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
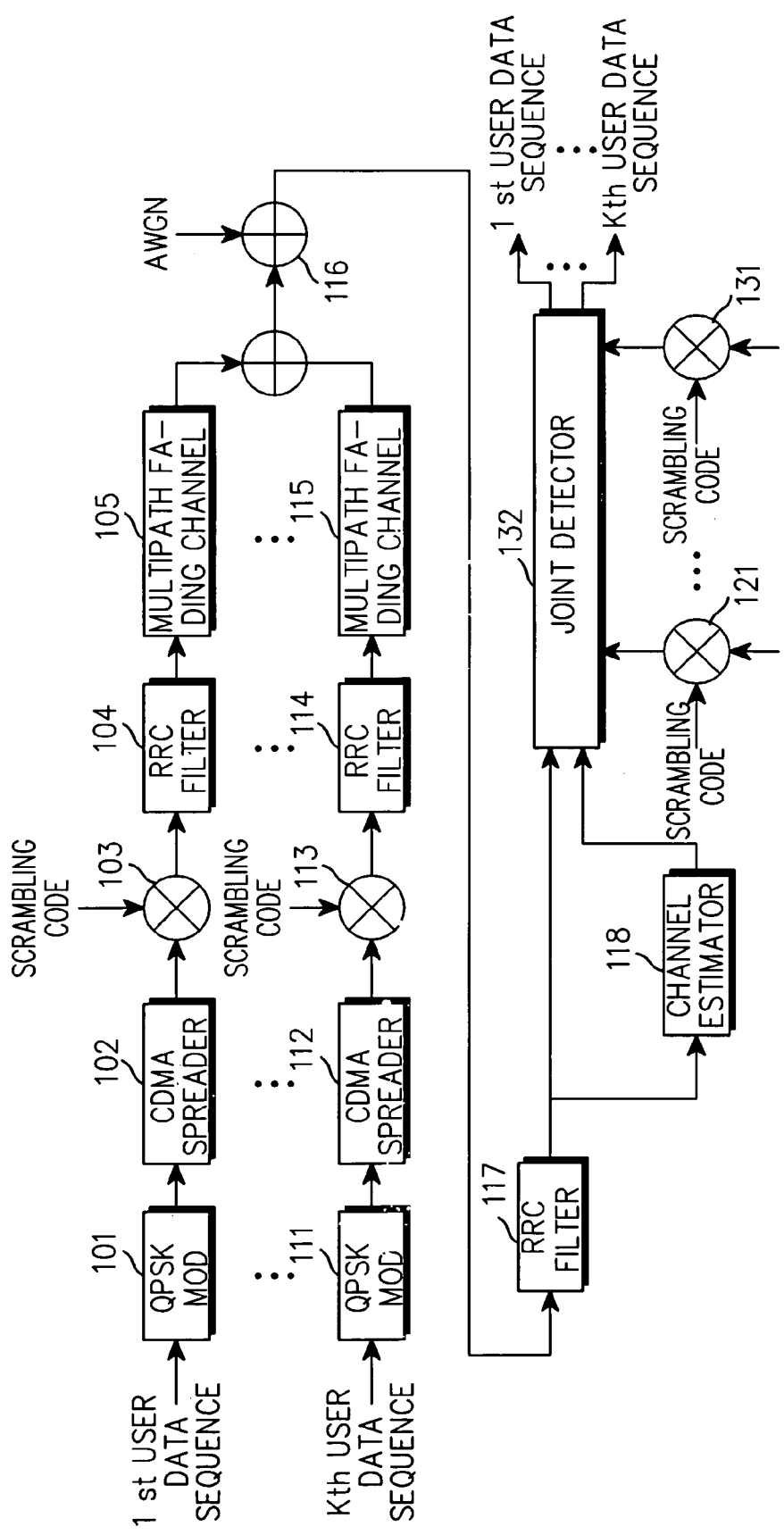
FIG. 1 illustrates structures of an uplink transmitter, a channel and a receiver with a joint detector in a 3GPP/TDD CDMA communication system according to the prior art.
Figure 2:
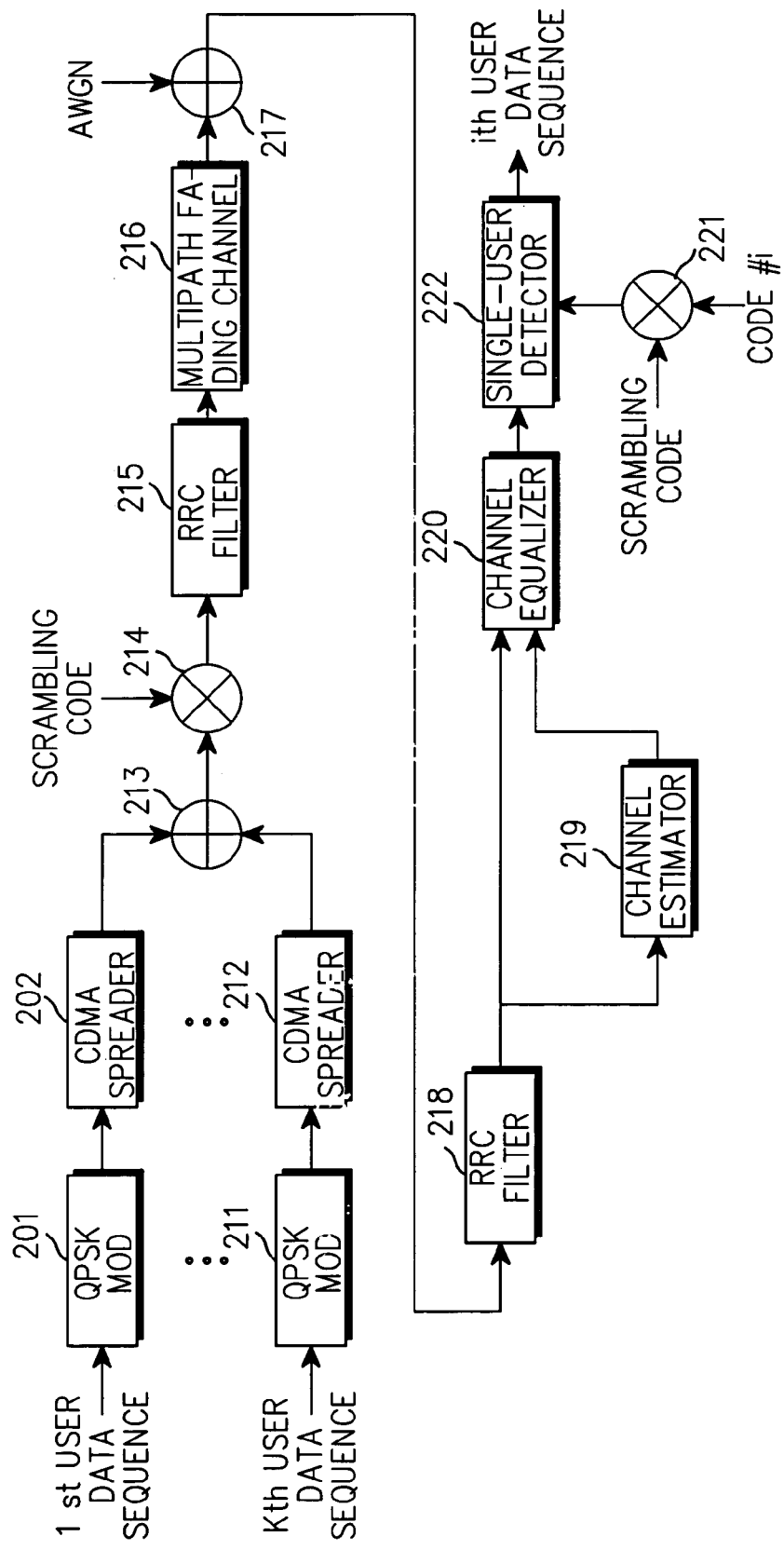
FIG. 2 illustrates structures of a downlink transmitter, a channel and a receiver with a joint detector in a 3GPP/TDD CDMA communication system according to the prior art.
Figure 3:
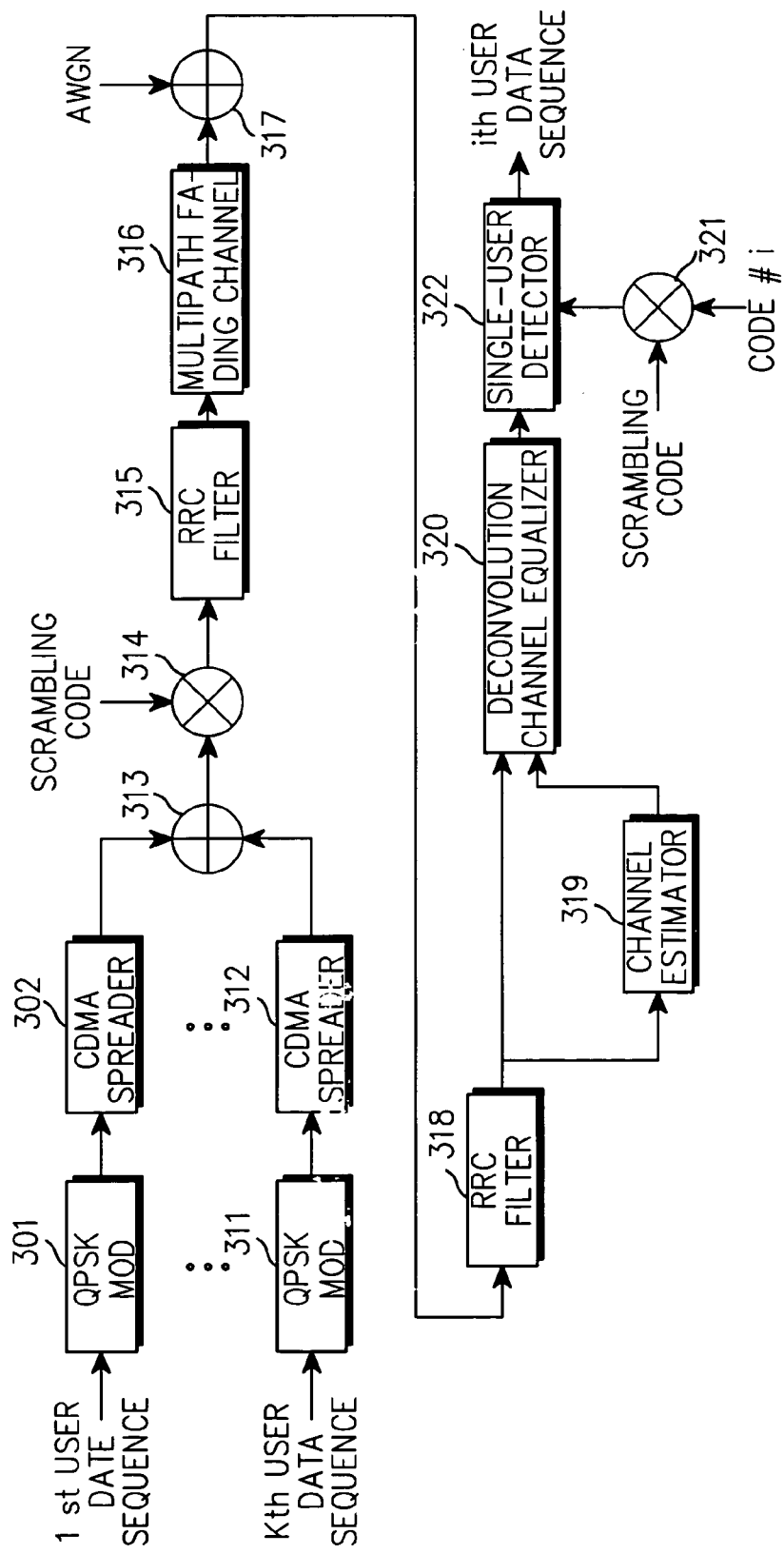
FIG. 3 illustrates structures of a downlink transmitter, a channel and a receiver with a joint detector in a 3GPP/TDD CDMA communication system according to an embodiment of the present invention.

FIG. 3 illustrates structures of a downlink transmitter, a channel and a receiver with a joint detector in a 3GPP/TDD CDMA communication system according to an embodiment of the present invention. Here, in the downlink, a transmitter serves as a base station and a receiver serves as a mobile station. Further, the transmitter has the same structure as the transmitter illustrated in FIG. 2.

Referring to FIG. 3, a first user's data sequence is modulated into a QPSK signal by a QPSK modulator 301, and then spread with a spreading code assigned to the first user by a CDMA spreader 302. Likewise, a $K^{th}$ user's data sequence is modulated into a QPSK signal by a QPSK modulator 311, and then spread with a spreading code assigned to the $K^{th}$ user by a CDMA spreader 312. The spread signals of the respective users are summed (or XORed) on a chip level by a summer 313, and then scrambled with a unique scrambling code of the base station by a scrambler 314. The scrambled signal is filtered by an RRC filter 315 before being transmitted. The transmitted signal, to which AWGN 317 is added while it passes a multipath fading channel 316, is received at the receiver.

The receiver provides the received signal to a channel estimator 319 and a deconvolution channel equalizer 320, after passing through an RRC filter 318. The channel estimator 319 performs channel estimation on a channel impulse response of the multipath fading channel, and provides the channel-estimated results to the deconvolution channel equalizer 320. The deconvolution channel equalizer 320 compensates for multipath channel fading of the received signal using the estimated channel impulse response, thereby to remove multipath interference from the received signal. A detailed description of the deconvolution channel equalizer 320 will be given later. The signal output from the deconvolution channel equalizer 320 is provided to a single-user detector 322. The single-user detector 322 detects an $i^{th}$ user's data sequence using an $i^{th}$ user's spreading code and a scrambling code output from a multiplier 321.

A detailed description of the deconvolution channel equalizer 320 will be made herein below. The deconvolution channel equalizer 320 reduces matrix calculations performed in a channel equalizer by a deconvolution technique. The conventional channel equalizer 220 performs inverse matrix calculations using the Cholesky Decomposition technique and the forward and reverse replacement and elimination technique in order to implement Equation (17). The matrix calculation and inverse matrix calculation processes require considerable calculations as demonstrated above. However, the deconvolution channel equalizer 320 according to the present invention searches a value satisfying Equation (20) below in order to calculate a chip-level output $s_{ZF}^{(k)}$ with multipath interference removed.

$$H^{(k)} \cdot s_{ZF}^{(k)} = r^{(k)} \qquad (20)$$

$$\begin{bmatrix} h_1 & 0 & \cdots & 0 \\ h_2 & h_1 & \cdots & \vdots \\ h_W & h_2 & \cdots & 0 \\ 0 & h_W & \cdots & h_1 \\ \vdots & \vdots & \vdots & h_2 \\ 0 & 0 & \cdots & h_W \end{bmatrix} \begin{bmatrix} \hat{s}_1 \\ \hat{s}_2 \\ \vdots \\ \hat{s}_{NQ} \end{bmatrix} = \begin{bmatrix} r_1 \\ r_2 \\ \vdots \\ r_{NQ+W-1} \end{bmatrix}$$

By using the deconvolution technique, it is possible to calculate $$s_{ZF}^{(k)}$$

satisfying Equation (20) as follows.

$$\hat{s}_j = \frac{r_j}{h_1}, \text{ for } j = 1 \qquad (21a)$$

$$\hat{s}_j = \frac{1}{h_1}\left\{r_j - \sum_{i=2}^{J} h_i \hat{s}_{j-i+1}\right\}, \text{ for } j = 2, 3, \ldots, W \qquad (21b)$$

$$\hat{s}_j = \frac{1}{h_1}\left\{r_j - \sum_{i=2}^{W} h_i \hat{s}_{j-i+1}\right\}, \text{ for } j = W+1, W+2, \ldots, NQ \qquad (21c)$$

In this manner, it is possible to calculate a multipath interference-removed chip-level output $$s_{ZF}^{(k)}$$

like Equation (17), if there is no noise. As for calculations of the deconvolution channel equalizer 320 in terms of the number of multiplications and divisions, Equation (21a) requires a one time calculation, Equation (21b) requires $2+3+\ldots W=W\cdot(W+1)/2-1$ times of multiplications, and Equation (21c) requires $W\cdot(NQ-W)=NQW+(W-W^2)/2$ times of multiplications.

That is, calculations of the deconvolution channel equalizer 320 are in proportion to NQW, so it is possible to remarkably reduce calculations as compared with the symbol-level and chip-level ZF joint detectors. A comparison between the above-stated three joint detectors will be made in terms of calculations with reference to Table 1. Table 1 shows calculations in a step where calculations are most dominant, in terms of the order of the system variables.

TABLE 1

| Downlink JD Algorithm | Calculations |
| --- | --- |
| Symbol-level ZF JD | $(KN)^2$ |
| Chip-level ZF JD | $W^2QN$ |
| Chip-level Deconvolution ZF JD | WQN |

As illustrated in Table 1, compared with other algorithms, the chip-level deconvolution ZF joint detector reduces as many calculations as at least a first order of the system variable. That is, since the deconvolution channel equalizer 320 can remarkably reduce calculations and complexity, it can be used as a scheme for calculating an initial value not only in the ZF joint detector algorithm but also in the MMSE joint detector algorithm and another joint detector algorithm combined with the ZF or MMSE joint detector.

As described above, the joint detector used in the downlink receiver reduces inverse matrix calculations that comprise almost all of the calculations of the joint detector, contributing to a reduction in the overall complexity of the receiver. The reduction in complexity of the joint detector results in an improvement of downlink performance. Further, the reduction in calculations and complexity of the joint detector contributes to a reduction in power consumption of the downlink receiver, i.e., the mobile station. In addition, the joint detection algorithm of the chip-level ZF joint detector according to the present invention enables other joint detector algorithms to calculate an initial value with fewer calculations, so it can be applied to various joint detector algorithms.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A ZF (Zero Forcing) joint detection apparatus used for a downlink receiver, comprising:
   a channel estimator for estimating a channel impulse response of a multipath fading channel of a received signal;
   a channel equalizer including means for estimating a transmission signal $\hat{s}_j$ by performing channel compensation and removing multipath interference by a deconvolution technique based on the estimated channel impulse response h of the received signal $r_j$, represented by the following equation:

$$\hat{s}_j = \frac{r_j}{h_1}, \text{ for } j = 1;$$

-continued $$\hat{s}_j = \frac{1}{h_1}\left\{r_j - \sum_{i=2}^{J} h_i \hat{s}_{J-i+1}\right\}, \text{ for } j = 2, 3, \ldots, W; \text{ and}$$

$$\hat{s}_j = \frac{1}{h_1}\left\{r_j - \sum_{i=2}^{W} h_i \hat{s}_{j-i+1}\right\}, \text{ for } j = W+1, W+2, \ldots, NQ,$$

wherein N, Q, and W are positive integers respectively representing, a length of a data sequence, a length of a spreading sequence, and a length of a channel impulse response; and a user detector for receiving the transmission signal from the channel equalizer and for detecting a symbol-level data sequence transmitted by a specific user.

2. The apparatus as claimed in claim 1, wherein the user detector adetects the symbol-level data sequence transmitted by the specific user by despreading the transmission signal estimated by the channel equalizer with a spreading code for the specific user and a scrambling code.

3. A ZF (Zero Forcing) joint detection apparatus in a downlink receiver, for detecting a data sequence transmitted by a specific user, in a CDMA (Code Division Multiple Access) communication system in which there are K users, a length of a data sequence is N, a length of a spreading sequence is Q, and a length of a channel impulse response is W, the apparatus comprising:

a channel estimator for estimating the channel impulse response of a multipath fading channel of a received signal;

a channel equalizer for estimating a chip-level transmission signal $\hat{s}_j$ by performing channel compensation and removing multipath interference by a deconvolution technique based on the estimated channel impulse response h of the received signal $r_j$, represented by the following equation:

$$\hat{s}_j = \frac{r_j}{h_1}, \text{ for } j = 1;$$

$$\hat{s}_j = \frac{1}{h_1}\left\{r_j - \sum_{i=2}^{j} h_i \hat{s}_{j-i+1}\right\},$$

for j=2, 3, . . . , W; and $$\hat{s}_j = \frac{1}{h_1}\left\{r_j - \sum_{i=2}^{W} h_i \hat{s}_{j-i+1}\right\},$$

for j=W+1, W+2, . . . , NQ,
wherein K, N, Q, and W are positive integers; and
a user detector for receiving the chip-level transmission signal $\hat{s}_j$ estimated by the channel equalizer and detecting a symbol-level data sequence transmitted by the specific user.

4. The apparatus as claimed in claim 3, wherein the user detector detects the symbol-level data sequence transmitted by the specific user by despreading the chip-level transmission signal $\hat{s}_j$ estimated by the channel equalizer with a spreading code for the specific user and a scrambling code.

5. A ZF (Zero Forcing) joint detection method for a downlink receiver, comprising the steps of:

estimating a channel impulse response of a multipath fading channel of a received signal;

estimating a transmission signal $\hat{s}_j$ by performing channel compensation and removing multipath interference by a deconvolution technique based on the estimated channel impulse response h of the received signal $r_j$, represented by the following eciuation:

$$\hat{s}_j = \frac{r_j}{h_1}, \text{ for } j = 1;$$

$$\hat{s}_j = \frac{1}{h_1}\left\{r_j - \sum_{i=2}^{J} h_i \hat{s}_{J-i+1}\right\}, \text{ for } j = 2, 3, \ldots, W; \text{ and}$$

$$\hat{s}_j = \frac{1}{h_1}\left\{r_j - \sum_{i=2}^{W} h_i \hat{s}_{j-i+1}\right\}, \text{ for } j = W+1, W+2, \ldots, NQ,$$

wherein N, Q, and W are positive integers respectively representing, a length of a data sequence, a length of a spreading sequence, and a length of a channel impulse response; and detecting a symbol-level data sequence transmitted by a specific user by using the estimated transmission signal.

6. The method as claimed in claim 5, wherein the step of detecting the symbol-level data sequence transmitted by the specific user is performed by despreading the estimated transmission signal with a spreading code for the specific user and a scrambling code.

7. A ZF (Zero Forcing) joint detection method in a downlink receiver, for detecting a data sequence from a specific user, in a CDMA (Code Division Multiple Access) communication system in which there are K users, a length of a data sequence is N, a length of a spreading sequence is Q, and a length of a channel impulse response is W, the method comprising the steps of:

estimating a channel impulse response of a multipath fading channel of a received signal;

performing channel compensation and removing multipath interference based on the estimated channel impulse response h of the received signal $r_j$ using a deconvolution technique;

estimating a first sequence of a chip-level transmission signal $\hat{s}_j$ in accordance with $$\hat{s}_j = \frac{r_j}{h_1}, \text{ for } j = 1;$$

estimating second to $W^{th}$ sequences of the estimated chip-level transmission signal $\hat{s}_j$ in accordance with $$\hat{s}_j = \frac{1}{h_1}\left\{r_j - \sum_{i=2}^{j} h_i \hat{s}_{j-i+1}\right\},$$

for j=2, 3, . . . , W;
estimating $(W+1)^{th}$ to $(NQ)^{th}$ sequences of the estimated chip-level transmission signal $\hat{s}_j$ in accordance with $$\hat{s}_j = \frac{1}{h_1}\left\{r_j - \sum_{i=2}^{W} h_i \hat{s}_{j-i+1}\right\},$$

for j=W+1, W+2, . . . , NQ,
wherein K, N, Q and W are positive integers; and
detecting a symbol-level data sequence transmitted by the specific user by using at least one of the sequences of the estimated chip-level transmission signal.

8. The method as claimed in claim 7, wherein the step of detecting the symbol-level data sequence transmitted by the specific user is performed by despreading the estimated at least one of the sequences of the chip-level transmission signal with a spreading code for the specific user and a scrambling code.

* * * * *